United States Patent Office 2,846,235
Patented Aug. 5, 1958

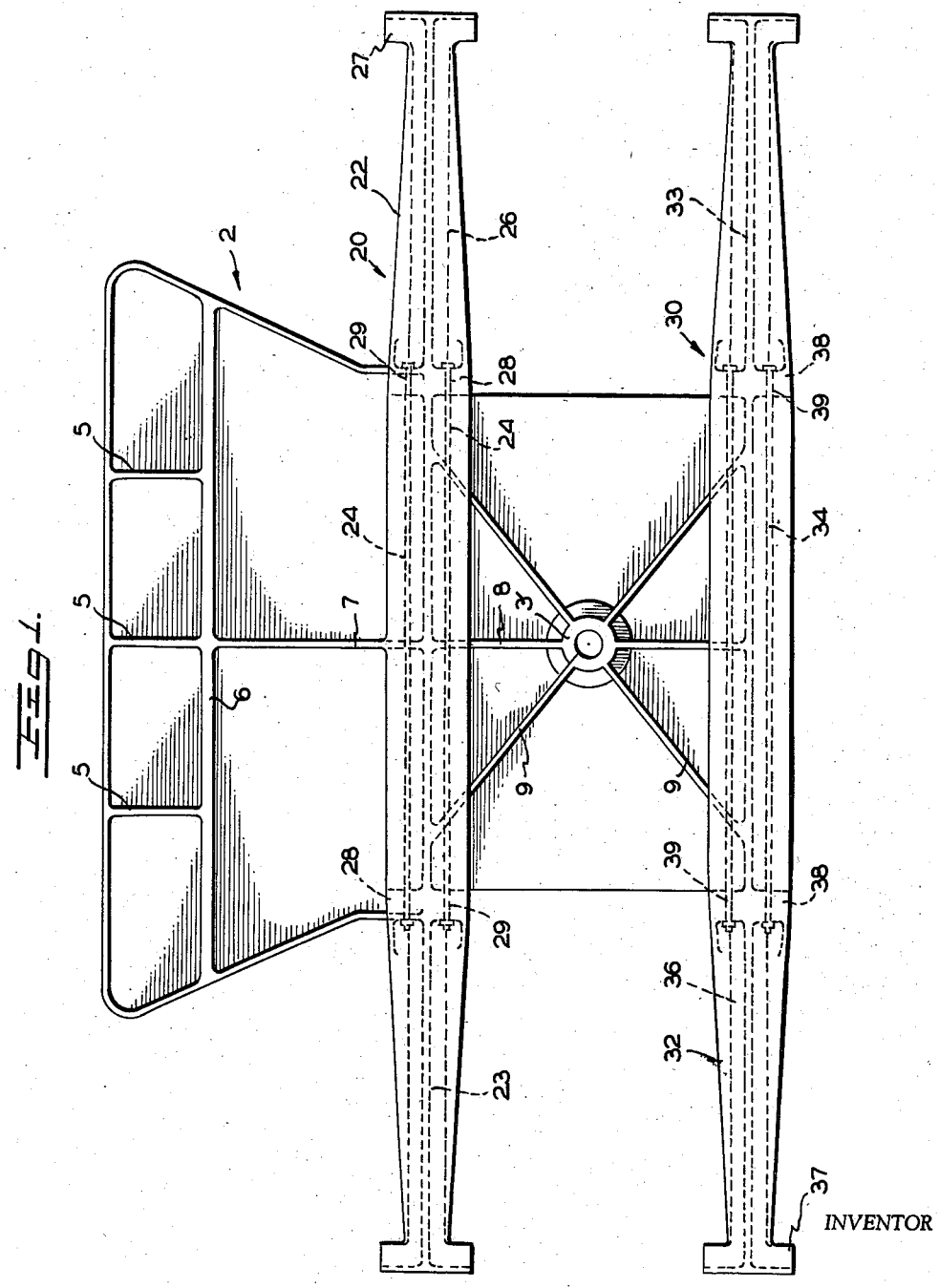

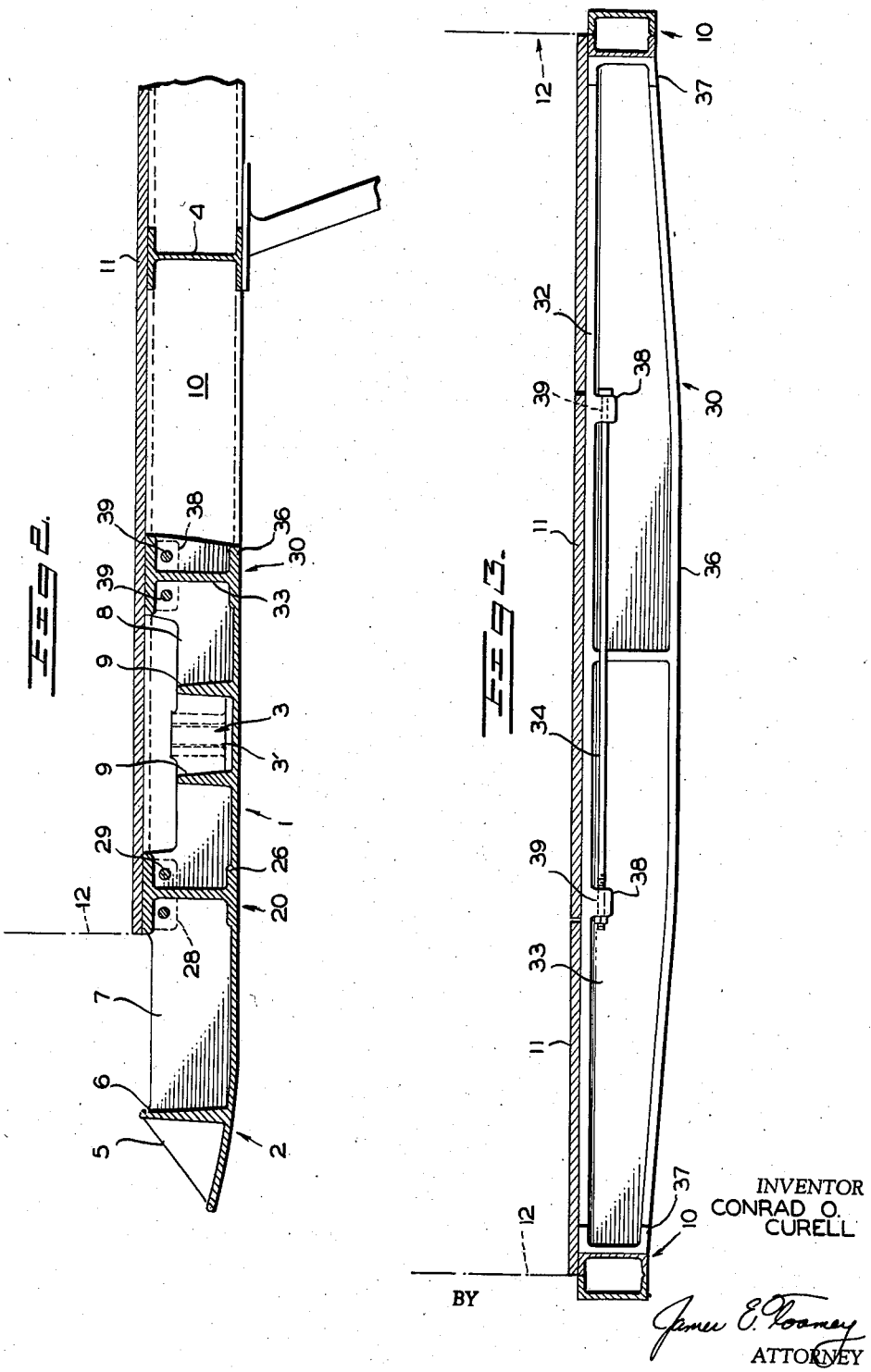

2,846,235

PRESTRESSED CAST UPPER FIFTH WHEEL STRUCTURE FOR ARTICULATED VEHICLES

Conrad O. Curell, Highland Park, Ill., assignor to Kaiser Aluminum & Chemical Corporation, Oakland, Calif., a corporation of Delaware Application February 16, 1956, Serial No. 565,816

10 Claims. (Cl. 280—433)

This invention relates to pivotal connections for articulated vehicles. Specifically, the invention relates to a novel pivotal connection known in the automotive trade as a "fifth wheel" assembly. Such assemblies are more generally in use in the familiar tractor and semi-trailer transport rigs seen in constant use on the nations highways.

Generally, the fifth wheel comprises an upper plate having a flat surface and some form of pivot pin. A lower support carried by the tractor generally includes a releaseable latch structure engageable with the pivot pin. The lower support also includes either roller means engageable with the lower surface of the upper fifth wheel assembly or a slide or runner means by which the upper assembly may be contacted by the lower assembly prior to the time when the latch structure is actuated such as to engage the conventional pivot pin.

In usual practice the lower assembly is carried by the chassis of the self-propelled motor vehicle known as the tractor, as has been described, and the upper assembly is the foremost support for a two or tandem wheeled semi-trailer in which cargo is generally carried. In use, fifth wheel assemblies are the sole connection and hence the sole resistance factor or element opposing the various forces imposed by reason of the articulated relation of the various vehicular components. Such forces are those vertical loads imposed by reason of cargo weight, horizontal loads imposed by reason of the forward and backward movement of the tractor and trailer, diagonal twisting forces due to the twisting between the vehicular components during the turning of the vehicle around corners, etc., to say nothing of vertical and horizontal forces produced in the connection by reason of rough or undulating roads and highways.

These forces in turn set up compression, tension and bending stress and combinations thereof in the material of which the fifth wheel may be fabricated. Thus, a fifth wheel assembly must be of such a design as to use most effectively all possible resistance of the material to failure resulting from adverse force conditions. Of necessity, such designs result in increased weight. Increased weight in turn usually means a decrease in the payload that may be transported on the cargo carrying portion of such an articulated vehicle.

This weight limitation is important in view of the fact that most states impose overall gross weight limitations on loaded vehicles to prevent destruction of highways. An axiomatic result of such weight limitations is that any increase in the dead or tare weight of the unloaded vehicle results in a decrease in the payload capacity of the loaded vehicle while maintaining the proper permissible weight limitations.

One apparent solution to the problem of the never ending strength versus weight compromise, which is the inevitable result of the facts as outlined above, would be to incorporate light metals such as aluminum, magnesium, in all such vehicular components as is practical. However, the solution is not satisfactory in all cases in that light metals and in particular cast light metal parts have hithertofore not successfully met the requirements of severe service conditions which exist in the fifth wheel connection between articulated vehicles.

Accordingly, this invention is primarily concerned with an upper fifth wheel structure for articulated vehicles, wherein the fifth wheel may be incorporated in the cargo carrying floor and wherein the resistance of the material, such as cast aluminum, or other light metals, is enhanced to a considerable degree by incorporating in the fifth wheel design a novel means for producing a prestressed condition in the material. Generally, it may be said that this prestressing of the material is of such a nature and kind that when the loads of a useful cargo are imposed on the cast fifth wheel assembly, the resultant forces produced by such static loading as well as the dynamic loading produced by vehicular movement and all combinations thereof can be resisted successfully by a single, integral, light and relatively inexpensive casting. This casting, while strong in compression and weak in tension, will thus have strains introduced therein of all natures but can and will resist these factors to enable successful and practical service in what might be considered previously, extremely adverse environments for such cast parts.

Accordingly, an object of the invention is to produce a novel fifth wheel assembly, in which the advantages resulting from the use of a light metal may be fully enjoyed.

A further object of the invention is to produce a novel fifth wheel assembly in which the upper or trailer portions of the assembly may be comprised of cast aluminum.

Still another object of the invention is to produce a novel upper fifth wheel casting, which not only contributes materially to a decrease in the dead or tare weight of a semi-trailer but also is equal to and often times more efficient than heavier structure or heavier materials used in resisting destructive forces and loads imposed thereon.

A still further object of the invention is to produce a novel upper fifth wheel casting for articulated vehicles, wherein the upper fifth wheel may be advantageously incorporated as an integral part in the floor structure of the cargo carrying portion of such a vehicle.

A further object of the invention is to produce a novel prestressed cast upper fifth wheel structure for articulated vehicles wherein the light metal from which the upper assembly is formed may be initially stressed in such a manner that, when cargo loads are imposed on that portion of the vehicle adapted to carry cargo, the effective stress conditions are such as to never exceed the yield strength of the casting even under the most adverse conditions for such material.

These and other advantageous features and objects of the invention will be more readily seen by the following detailed description when taken in conjunction with the appended drawings wherein:

Figure 1 is a top view of the cast fifth wheel structure of the instant invention, Figure 2 is a side sectional view taken through the line 2—2 of Figure 1 with parts of the structure of the cargo carrying portion of the articulated vehicle shown to illustrate a manner in which the cast fifth wheel structure may be incorporated, and Figure 3 is a rear elevational view of the cast fifth wheel structure of the instant invention, parts of a semi-trailer again being shown for clarity.

Referring now in particular to Figure 1 of the drawings, it may be seen that the cast fifth wheel structure generally comprises a base plate 1 having an arcuate extension or lip 2 extending along one edge thereof. As may be seen from the outline of the trailer structure 12, as shown in Figure 2, the lip 2 extends in a direction forwardly of the fifth wheel base plate and has a lower slightly arcuate bottom surface. In addition, the width of the arcuate extension or lip 2 is substantially greater than the maximum width across the base plate 1 so as to enable the lower or tractor part of the fifth wheel to be moved beneath the lower surface of the upper fifth wheel casting, though the tractor may be in angular relation with respect to the semi-trailer.

The forward portion of the arcuate extension includes a transverse rib 6 to which are fixed a series of generally triangular shaped vertically disposed web members 5 which reinforce the foremost portions of lip 2. Also incorporated in portion 2 is a longitudinally extending rib element 7, which is coterminous with a similar rib 8 formed integrally with the base plate and thus combines with the rib 8 to extend substantially the entire length of the cast fifth wheel structure.

Referring to the base plate 1, it may be seen that a centrally disposed bore 3 in a generally cylindrical boss 3' is provided therein. Radiating outwardly from the central boss 3' are a series of symmetrically arranged rib elements 9 which extend at substantially 90 degree angles with respect to each other. Rib elements 9 are advantageously disposed in such a manner that no single rib is in alignment with the longitudinal axis of the plate structure.

Disposed on the upper surface of the plate 1 are a pair of laterally extending beam elements 20 and 30 integrally formed with plate 1 and lip 2. These beam elements may generally be considered to be I-beams. Beam 20 has an upper flange portion 22 and a lower flange 26. This latter and lowermost flange 26 is obtained by a thickening of the material across the base plate and beneath the upper flange portion 22, the two being connected by a web 23.

Beam 30 is similar to beam 20 and includes an upper flange 32, a lower flange 36 formed in a manner similar to the formation of flange 26, the two being interconnected by vertically disposed web element 33. It is to be noted that the respective beams 20 and 30 are in parallel relation and they are so arranged as to be spaced an equal distance from the central axis of pin receiving boss 3' and aperture 3. Thus, the beams are in a sense symmetrically arranged with respect to the longitudinal and lateral axes of the base plate 1.

Also, it is to be noted that the top flange of the respective beams 20 and 30 are provided with downwardly extending lugs or ears 28 and 38, respectively, so arranged as to present a vertical wall extending in a direction normal to both the lateral extent of the beam and the vertical webs 23 and 33. Four of such lugs or ears 28 and 38 are provided on each of the beams 20 and 30, respectively, and the vertical walls are located in such a manner to be in horizontal alignment but in vertically spaced relation to the outermost or lateral edges of the base plate 1.

These lugs or ears 28 and 38 are provided with transverse bores 29 and 39 in axial alignment and being so arranged as to permit the insertion of pairs of high-tensile steel rod-like bolts 24 and 34, respectively. These bolts parallel each of the top flanges of the I-beam elements 20 and 30. The rods 24 and 34 may comprise steel rods which may be tensioned to a predetermined value by the application of suitable nuts as is conventional on that end of the bolts opposite the usual head. Thus, the bolts or rods 24 and 34 extend across or transverse to the longitudinal axis of a base plate 1 and are symmetrically arranged and are parallel to the vertical web portions 23 and 33 of the respective beams 20 and 30.

By the application of suitable wrench means when in proper position, the bolts or rods 24 and 34 may be tightened or torqued such as to induce a condition of tension in the material thereof. Since a force generated in the tensile steel material must be opposed by an equal and opposite force in the beam flanges 22 and 32, a condition of compression is caused to exist along the top flange of the respective beams 20 and 30 by the translation of forces through the ears 28 and 38.

Thus, when static loads are imposed on the semi-trailer the effect thereof is to create a downward force component along the entire lateral extent of the respective beams. Normally such a condition would be opposed by the upward reaction, as is usual, produced around the central pivot pin as received in the bore or aperture 3. Thus in ordinary conditions the deflection of the beams would put the top flanges of the beams in tension and the lower flanges, including the base plate 1, would be in compression. Since castings are, relatively speaking, weaker in tension than they are in compression, it is easily seen that the yield strength of the material would ordinarily be exceeded along the top flanges of the beams far short of the actual strength requirements necessary.

The usual alternative in such circumstances would be to strengthen the part by adding more and more material to increase the section modulus of the beams. This solution has obvious disadvantages particularly in cast fifth wheel structures which would become so massive as to be impractical in the uses for which intended. The addition of metal would increase weight and as a result all of the mentioned advantages begin to disappear. The end result is that only fabricated structures, expensive not only from the standpoint of labor but also in scrap material, are more favorably considered as a satisfactory solution to the problem.

However, in the present invention the condition of compression caused to exist by the prestressing of the top flange of the beam across that portion thereof spaced above the lateral extent of the base plate 1 is effective to cause the stresses produced by useful loads to in effect reduce the prestressed compressive force existing in said top flange. Thus, the effective result of such an arrangement is to neutralize the opposing stresses such that the part of the beams located directly over the base plate 1 receives opposing loads or stresses, i. e., compression and tension in such a manner that these opposing forces tend to nullify one another and produce a condition in the material such that the casting can successfully withstand tension stresses far above its ordinary ultimate limit and capacity. In other words, the casting takes the load in compression.

The above described condition is effected by reason of the fact that the beams 20 and 30 are so arranged that pad members 27 and 37 at the opposite extremities thereof may be connected to the side rails 10 of a conventional semi-trailer, as illustrated in Figure 2. When so connected, the beams 20 and 30 will form the forward portion of the ordinary laterally extending reinforcing elements 4 that normally support the trailer floor 11. Thus, the entire integral cast structure is incorporated in the semi-trailer vehicle as a part of the forward floor section thereof. Such loads as are imposed on the trailer by reason of movement of the vehicle when loaded and also by reason of the cargo being carried will thus be transferred from the side rails through the pads 27 and 37 across the beams 20 and 30 into the plate 1 and concentrated at the point of pivotal connection 3.

In view of the above, it will be observed that the prestressed casting by reason of the high tensile strength of rods 24, 34 and as incorporated in the vehicle floor structure will be such as to be capable of withstanding such loads as compression, tension and deflection while at no time will the yield strength of the casting be exceeded. These rods serve also to raise the neutral axis of the section and reduce deflection because of steel's greater modulus of elasticity.

It will be appreciated that the amount of prestress necessary in the top flanges of the beams 20 and 30 may be calculated by usual stress analysis methods. Thus for a given load factor the casting may be fabricated, the tensioning means 24 and 34 inserted in place and by the application of a proper amount of torque thereto a fixed determined amount of compressive stress can be caused to exist in the top flanges 22 and 32. Of course, a considerable factor of safety is always incorporated in such stress analysis such that should the vehicle be inadvertently overloaded failure of the cast structure will be avoided.

It will be appreciated further that the fabrication of a fifth wheel assembly by casting the unit as an integral piece of metal reduces considerably the cost thereof over a product that may be formed by conventional fabrication methods. In addition, very close tolerances can be maintained during the casting process which would be effective to reduce any subsequent expensive machining operations. While one exemplary embodiment of the cast fifth wheel structure has been shown, it is to be appreciated that the spirit and scope of the invention is limited only as specified in the following claims.

What is claimed is:

1. An upper fifth wheel casting of light metal for articulated vehicles, a generally horizontally disposed elongated plate member including an integrally formed extension adjacent one edge and parallel integrally formed beam-like members, portions of said beam-like members adapted to be incorporated in the floor structure of one portion of said articulated vehicle, said upper fifth wheel casting including prestressing means comprising tensioning means extending parallel with and engaging the top surface of each of said integrally formed beam-like members, said prestressing means producing a stressed condition in said casting prior to the imposition of useful loads thereon, whereby as such loads are subsequently applied to said casting the resultant stress produced in material comprising said beam-like members will approach but not reach the ultimate strength of the material from which the casting is made.

2. An upper fifth wheel structure as defined in claim 1 wherein said casting is comprised of aluminum.

3. A cast upper fifth wheel structure of light metal for articulated vehicles comprising a generally elongated and horizontally disposed plate-like member having an arcuate extension adjacent one end thereof and having a centrally disposed aperture adapted to receive a pivot pin therein, said plate-like member further including spaced and parallel beam-like members extending in a direction transverse to the normal longitudinal axis of said plate-like member and are adapted to be incorporated into the floor structure of one portion of an articulated vehicle, each of said beam-like members comprising a web portion and a horizontally disposed top flange portion, means extending parallel with and engaging said beam-like members adjacent the top flange portions thereof for creating an initial prestressed condition of compression in said top flanges whereby as useful loads are imposed on said casting including the said beam, the resultant tension loads will be opposed by said prestressed compression such that the strain in the material will approach but not exceed the ultimate strength of said material from which the casting is made.

4. In an upper fifth wheel casting and the like for use in an articulated vehicle assembly, a generally horizontally disposed plate and integrally formed beam elements adapted to be incorporated into a vehicle floor, said plate being provided with means for receiving a pivot pin therein, and means carried by and engageable with said beam elements for inducing compressive stresses in said casting whereby as useful loads are imposed thereon, the resultant strain produced in said casting may approach without exceeding the ultimate strength of the material from which said casting is made.

5. An upper fifth wheel structure as defined in claim 4 wherein said casting is made of aluminum.

6. An upper fifth wheel casting of light metal for use in articulated vehicular assemblies comprising a generally horizontally disposed plate having an aperture therein adapted to receive a pivot pin, said plate including integrally formed beam elements extending across its upper surface and to either side thereof and adapted to be incorporated into a vehicle floor, and means for inducing an unloaded compressive stress condition in said casting whereby as useful loads are imposed thereon the resultant strain produced in the casting may approach but not exceed the ultimate strength in tension of the material from which the casting is made, said stressing means comprising tensioning means extending along and engageable with those portions of the upper surfaces of said beam elements which overlie the said plate.

7. A cast upper fifth wheel structure for articulated vehicles comprising a generally horizontally disposed rectangular plate having means adapted to receive a pivot pin, said plate further including integrally formed laterally extending beam-like members, portions of which are adapted to be incorporated in the floor structure of one of the components of an articulated vehicle, means for inducing a predetermined prestressed condition in said beam-like members comprising tensioning means engageable with and extending along the top surface of said laterally extending beam-like members whereby as a useful load is imposed on said casting including said beam-like members, the resultant stress produced in said casting will approach but not exceed the ultimate strength in tension of the material from which the casting is made.

8. An upper fifh wheel casting of light metal for articulated vehicles comprising a generally horizontally disposed plate-like member provided with centrally disposed means for receiving a pivot pin, said casting further including spaced parallel beam-like members extending in a direction transverse to the normal longitudinal axis of said plate-like members and adapted to be incorporated into the floor structure of one portion of said articulated vehicle, each of said beams having laterally extending apertured ear elements located adjacent the uppermost portion thereof, elongated parallel steel tensioning elements positioned within the apertures of said ear elements, said tensioning elements creating an initial condition of prestress in said casting whereby the upper portions of said beam-like members are placed in compression and said lower portion of said casting is placed in tension, the initial stress produced in said fifth wheel casting being substantially offset by the application of useful normal loads thereon, which loads impose a condition of stress on the casting such that the upper portion of said fifth wheel structure is in tension and said lower portion is in compression, the oppositely effective stresses producing a strain in said casting which will approach but never exceed the ultimate strength of the material of which said casting may be comprised.

9. An upper fifth wheel structure for articulated vehicles as described in claim 8, wherein said beams and said plate further include integrally formed reinforcement means comprising symmetrically arranged ribs.

10. An upper fifth wheel structure as defined by claim 8 wherein the cast plate and beams are comprised of aluminum.

References Cited in the file of this patent

UNITED STATES PATENTS

| 1,380,490 | Masury | June 7, 1921 |
| 1,770,932 | Leake | July 22, 1930 |
| 2,015,941 | Kingham | Oct. 1, 1935 |
| 2,455,153 | Abeles | Nov. 30, 1948 |

FOREIGN PATENTS

| 727,261 | France | Mar. 31, 1932 |